(No Model.)

F. R. HEWITT.
NUT LOCK.

No. 248,176. Patented Oct. 11, 1881.

WITNESSES:
Fred. G. Dieterich
A. G. Syne

INVENTOR:
F. R. Hewitt
BY
ATTORNEYS.

UNITED STATES PATENT OFFICE.

FRANCIS R. HEWITT, OF EVINGTON, VIRGINIA, ASSIGNOR TO HIMSELF AND EDWARD H. WOODWARD, OF NEW YORK CITY.

NUT-LOCK.

SPECIFICATION forming part of Letters Patent No. 248,176, dated October 11, 1881.

Application filed May 6, 1881. (No model.)

*To all whom it may concern:*

Be it known that I, FRANCIS R. HEWITT, a citizen of the United States, residing at Evington, in the county of Campbell and State of Virginia, have invented a new and useful Improvement in Nut-Locks, of which the following is a full, clear, and exact description, reference being had to the drawings hereto annexed.

My invention relates to that class of nut-locks in which a nut is provided with a spring and pin, which are set in its contact-surface and the latter made to engage with suitable recesses in the washer for holding the nut in position.

My improvement consists in certain peculiarities of construction, as hereinafter set forth.

Figure 1:
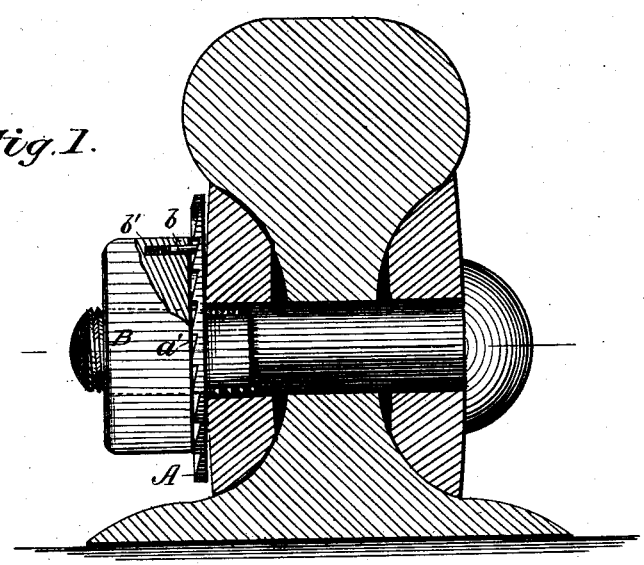
Figure 2:
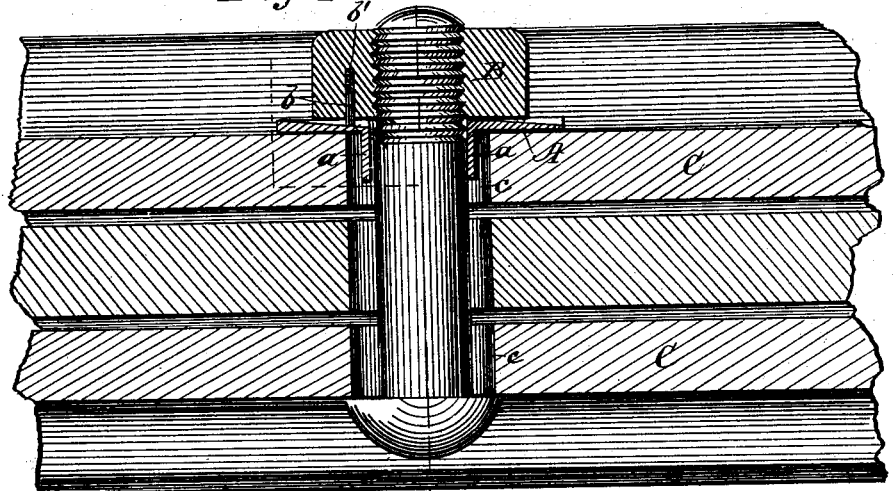
Figure 3:
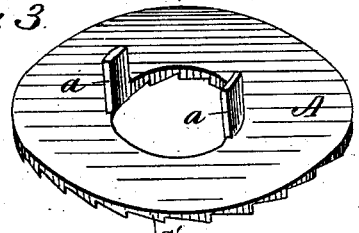

In the accompanying drawings, Figure 1 is a vertical sectional view of a rail and fish-plates; Fig. 2, a horizontal sectional view of the same, showing the adjustment of the washer; and Fig. 3, a side elevation of the washer, showing lugs for engaging with the perforation in the fish-plate.

The primary object of my invention is to construct a nut-lock which shall be adapted for use in combination with fish-plates having elongated perforations for the bolts to allow for expansion and contraction of the rails. Accordingly I provide a washer, A, having two opposite rectangular lugs, a a, struck up from its central portion on the edge of its central perforation. These lugs, when the washer is placed upon the bolt, are inserted into the elongated sides of the perforation c in the fish-plate C, and thus serve the purpose of preventing the washer from turning when the nut is screwed down. By such a construction the necessity of providing recesses for lugs upon washers as ordinarily constructed is avoided, and time and expense thereby saved. The opposite or outer face of the washer is constructed with the usual ratchet-surface, a', for holding the pin b, which is closely fitted in a small cylindrical seat, b', in the nut B, and preventing the latter from being accidentally unscrewed.

As heretofore constructed, locking-pins which are inserted into the contact-surface of a nut have been made with their projecting ends beveled or pointed, in order that they might more easily be sprung back to allow the unscrewing of the nut. This construction of the pin is more or less expensive, and not so well adapted for holding the nut securely as a square-headed pin. My invention, on the contrary, is adapted for the use of a square-headed pin, since, when the nut is to be removed, the pin may be easily lifted over the ratchets by inserting a thin blade under it from the outer edge of the washer. An additional advantage is that such a square-headed pin can be made by simply clipping off a piece of wire by the same tool that cuts the spiral coils which are used in connection with the pins.

It will be seen that my invention is not only simple in construction and less expensive than most other similar devices, but also perfectly adapted to accomplish its object.

Having thus described my invention, what I claim as new, and desire to secure by Letters Patent, is—

1. In a nut-lock, the ratchet-faced washer A, having two opposite rectangular lugs, a a, struck up from its central portion on the edge of its central perforation, substantially as shown and described, and for the purpose set forth.

2. In a nut-lock, the ratchet-faced washer A, having two opposite rectangular lugs, a a, on the edge of its central perforation, in combination with the fish-plate C, having the elongated perforation c, substantially as shown and described, whereby the washer may be prevented from turning when the nut is applied, as set forth.

3. In a nut-lock, the combination of nut B, having a small cylindrical seat, b', in its contact-surface, in which is seated a spiral spring and closely-fitting square-headed pin, b, the ratchet-faced washer A, having two opposite lugs, a a, on the edge of its central perforation, the fish-plate C, having elongated perforation c, and a suitable bolt, substantially as shown and described.

FRANCIS R. HEWITT.

Witnesses:
L. D. SOLOMON,
C. FRANK STEWART.